United States Patent
Woo (10) Patent No.: US 10,151,947 B2
(45) Date of Patent: Dec. 11, 2018

(54) IN-CELL TOUCH LIQUID CRYSTAL DISPLAY DEVICE AND METHOD OF MANUFACTURING THE SAME

(71) Applicant: LG Display Co., Ltd., Seoul (KR)

(72) Inventor: YoonHwan Woo, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 43 days.

(21) Appl. No.: 15/166,496

(22) Filed: May 27, 2016

(65) Prior Publication Data

US 2016/0349559 A1 Dec. 1, 2016

(30) Foreign Application Priority Data

May 29, 2015 (KR) .................. 10-2015-0076582

(51) Int. Cl.
| | |
|---|---|
| G02F 1/1333 | (2006.01) |
| G06F 3/041 | (2006.01) |
| G06F 3/044 | (2006.01) |
| G02F 1/1343 | (2006.01) |

(52) U.S. Cl.
CPC .......... *G02F 1/13338* (2013.01); *G06F 3/044* (2013.01); *G06F 3/0412* (2013.01); *G02F 2001/134372* (2013.01)

(58) Field of Classification Search
CPC .... G06F 3/0412; G06F 3/044; G02F 1/13338; G02F 2001/134372
See application file for complete search history.

(56) References Cited

U.S. PATENT DOCUMENTS

| | | | | |
|---|---|---|---|---|
| 9,190,422 B2* | 11/2015 | Hong | ............ | H01L 27/124 |
| 9,214,480 B2* | 12/2015 | Park | ............ | H01L 27/124 |
| 9,559,690 B2* | 1/2017 | Yang | ............ | G06F 3/0416 |
| 2008/0180622 A1* | 7/2008 | Horiguchi | ........ | G02F 1/134309 |
| | | | | 349/139 |
| 2013/0249820 A1* | 9/2013 | Woo | ............ | G06F 3/041 |
| | | | | 345/173 |
| 2013/0257794 A1* | 10/2013 | Lee | ............ | G06F 3/041 |
| | | | | 345/174 |
| 2014/0118277 A1* | 5/2014 | Kim | ............ | G06F 3/044 |
| | | | | 345/173 |
| 2014/0168537 A1* | 6/2014 | Han | ............ | G06F 3/0412 |
| | | | | 349/12 |
| 2015/0062451 A1* | 3/2015 | Ono | ............ | G02F 1/136227 |
| | | | | 349/12 |

* cited by examiner

*Primary Examiner* — Mariceli Santiago
(74) *Attorney, Agent, or Firm* — Birch, Stewart, Kolasch & Birch, LLP

(57) ABSTRACT

An in-cell touch liquid crystal display (LCD) device is discussed. The in-cell touch LCD device includes a pixel driver including a thin film transistor (TFT) disposed in each of a plurality of pixels, a passivation part protecting the pixel driver, a pixel electrode disposed on the passivation part and connected to a first electrode included in the TFT, and a touch electrode line disposed on the passivation part and insulated from the pixel electrode. The in-cell touch LCD further includes a cover part covering the pixel electrode and the touch electrode line, and a common electrode disposed on the cover part, connected to the touch electrode line via the cover part, and supplied with a common voltage or a touch driving signal from a touch driver connected to the touch electrode line.

15 Claims, 10 Drawing Sheets

FIG. 17

IN-CELL TOUCH LIQUID CRYSTAL DISPLAY DEVICE AND METHOD OF MANUFACTURING THE SAME

CROSS-REFERENCE TO RELATED APPLICATIONS

This application claims the benefit of the Korean Patent Application No. 10-2015-0076582 filed on May 29, 2015, which is hereby incorporated by reference as if fully set forth herein.

BACKGROUND OF THE INVENTION

Field of the Invention

The present invention relates to an in-cell touch liquid crystal display (LCD) device having a common electrode top structure and a method of manufacturing the same.

Discussion of the Related Art

Replacing a mouse, a keypad or a keyboard which has been conventionally applied to flat panel display devices, a touch screen that enables a user to directly input information with a finger or a pen is being widely applied to the flat panel display devices. Especially, since any users can easily manipulate the touch screen, the application of the touch screen is being expanded.

A touch screen is widely applied to monitors of navigations, industrial terminals, notebook computers, financial automation equipment, and game machines, portable terminals such as portable phones, MP3 players, PDAs, PMPs, PSPs, portable game machines, DMB receivers, and tablet personal computers (PCs), and home appliances such as refrigerators, microwave ovens, and washing machines.

The touch screen may be classified as following types based on a structure where the touch screen is coupled to a liquid crystal panel. The types of the touch screen include: an in-cell touch type in which the touch screen is built in a cell of a liquid crystal, an on-cell touch type in which the touch screen is disposed on a cell of a liquid crystal panel, an add-on type in which the touch screen is coupled to an outer portion of a liquid crystal display panel, and a hybrid type.

Hereinafter, a device where a touch screen (a touch panel) is combined with a liquid crystal panel is simply referred to as a touch LCD device.

Figure 1:
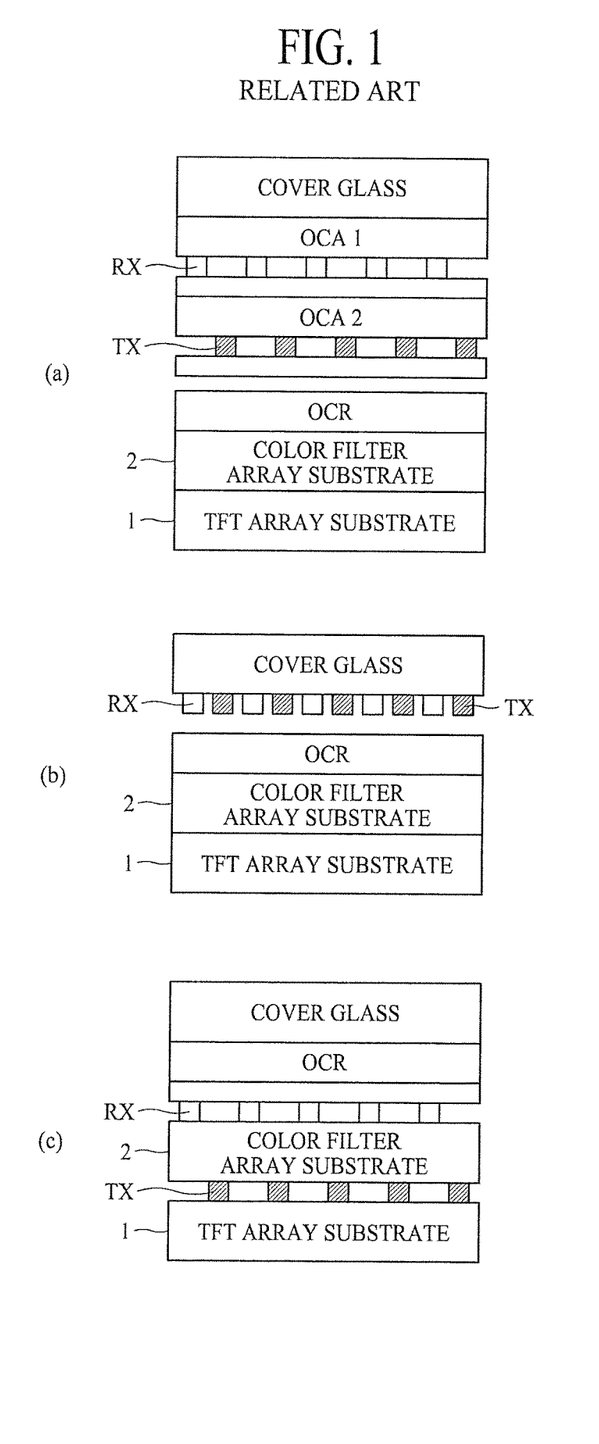
FIG. 1 is a diagram illustrating a related art touch LCD device to which a touch screen is applied.

FIG. 1 is a diagram illustrating a related art touch LCD device to which a touch screen is applied. FIG. 1(a) illustrates an add-on type touch LCD device. FIG. 1(b) illustrates a modified add-on type touch LCD device. FIG. 1(c) illustrates a hybrid type touch LCD device.

In the add-on type touch LCD device of FIG. 1(a) and the modified add-on type touch LCD device of FIG. 1(b), a touch screen is disposed on a liquid crystal panel that includes a thin film transistor (TFT) array substrate 1 and a color filter array substrate 2. A touch driving electrode (a TX electrode) and a touch receiving electrode (an RX electrode) are arranged in the touch screen. In this case, the touch driving electrode (the TX electrode) and the touch receiving electrode (the RX electrode) may be disposed on the same layer or different layers.

In the hybrid type touch LCD device of FIG. 1(c), a touch driving electrode (TX) is disposed on a TFT array substrate 1, and a touch receiving electrode (RX) is disposed on a color filter array substrate 2.

In a touch LCD device based on an add-on type, a modified add-on type, or a hybrid type, since a liquid crystal panel and a touch screen should be separately manufactured, a process of manufacturing the touch LCD device is complicated, and the cost increases. Also, defects can be generated in a process of bonding the liquid crystal panel to the touch screen.

Therefore, an in-cell touch LCD device where a touch electrode (a touch sensor) is embedded into a cell of a liquid crystal panel has been developed to reduce a thickness of a touch LCD device and the manufacturing cost. The in-cell touch LCD device uses a common electrode, which is disposed on a TFT array substrate, as a touch sensor.

Figure 2:
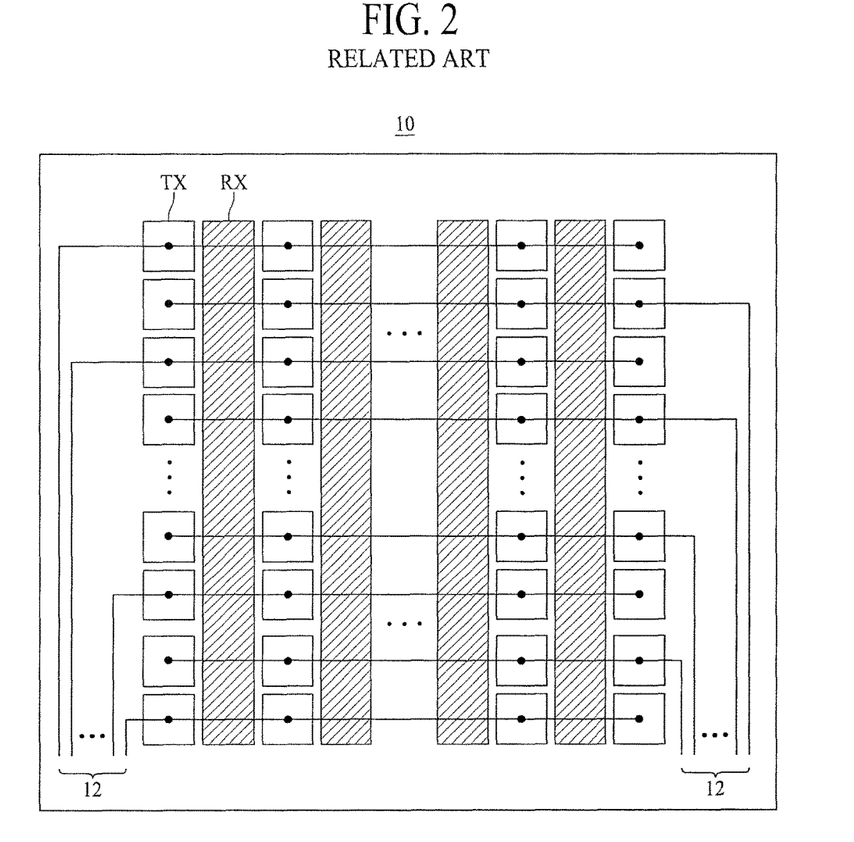
FIG. 2 is a diagram illustrating a related art in-cell touch LCD device based on a mutual capacitance type.

FIG. 2 is a diagram illustrating a related art in-cell touch LCD device based on a mutual capacitance type.

Referring to FIG. 2, in the related art in-cell touch LCD device based on the mutual capacitance type, common electrodes which are arranged on a TFT array substrate of a liquid crystal panel 10 are used as a touch driving electrode (TX) and a touch receiving electrode (RX).

In the related art of the in-cell touch LCD device based on the mutual capacitance type, a touch driving line 12 connected to the touch driving electrode (TX) is disposed in each of a left bezel area and a right bezel area of the liquid crystal panel 10.

For this reason, a bezel width of the in-cell touch LCD device increases.

SUMMARY OF THE INVENTION

Accordingly, the present invention is directed to providing an in-cell touch liquid crystal display (LCD) device and a method of manufacturing the same that substantially obviate one or more problems due to limitations and disadvantages of the related art.

An aspect of the present invention is directed to providing an in-cell touch LCD device, in which a common electrode is disposed on a thin film transistor (TFT) array substrate and is used as a touch electrode, and a method of manufacturing the same.

Additional advantages and features of the invention will be set forth in part in the description which follows and in part will become apparent to those having an ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an in-cell touch liquid crystal display (LCD) device that includes a pixel driver including a thin film transistor (TFT) disposed in each of a plurality of pixels, a passivation part protecting the pixel driver, a pixel electrode disposed on the passivation part and connected to a first electrode included in the TFT, a touch electrode line disposed on the passivation part and insulated from the pixel electrode, a cover part covering the pixel electrode and the touch electrode line, and a common electrode disposed on the cover part, connected to the touch electrode line via the cover part, and supplied with a common voltage or a touch driving signal from the touch driver connected to the touch electrode line.

In another aspect of the present invention, there is provided a method of manufacturing an in-cell touch liquid crystal display (LCD) device that includes forming a pixel driver, including a thin film transistor TFT, in each of a plurality of pixels, covering, by passivation part, the pixel driver, forming a pixel electrode, connected to a first electrode of the TFT via the passivation part, on the passivation part, forming a touch electrode line, insulated from the pixel electrode, on the passivation part, covering, by the cover part, the pixel electrode and the touch electrode line, and forming a common electrode, connected to the touch electrode line via the cover part and supplied with a common voltage or a touch driving signal from a touch driver connected to the touch electrode line, on the cover part.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

Like reference numerals refer to like elements throughout. In the below description, elements and functions that are irrelevant to the essentials of the present invention and have been known to those skilled in the art may not be provided.

Hereinafter, an in-cell touch LCD device and a method of manufacturing the same according to embodiments of the present invention will be described in detail.

Figure 3:
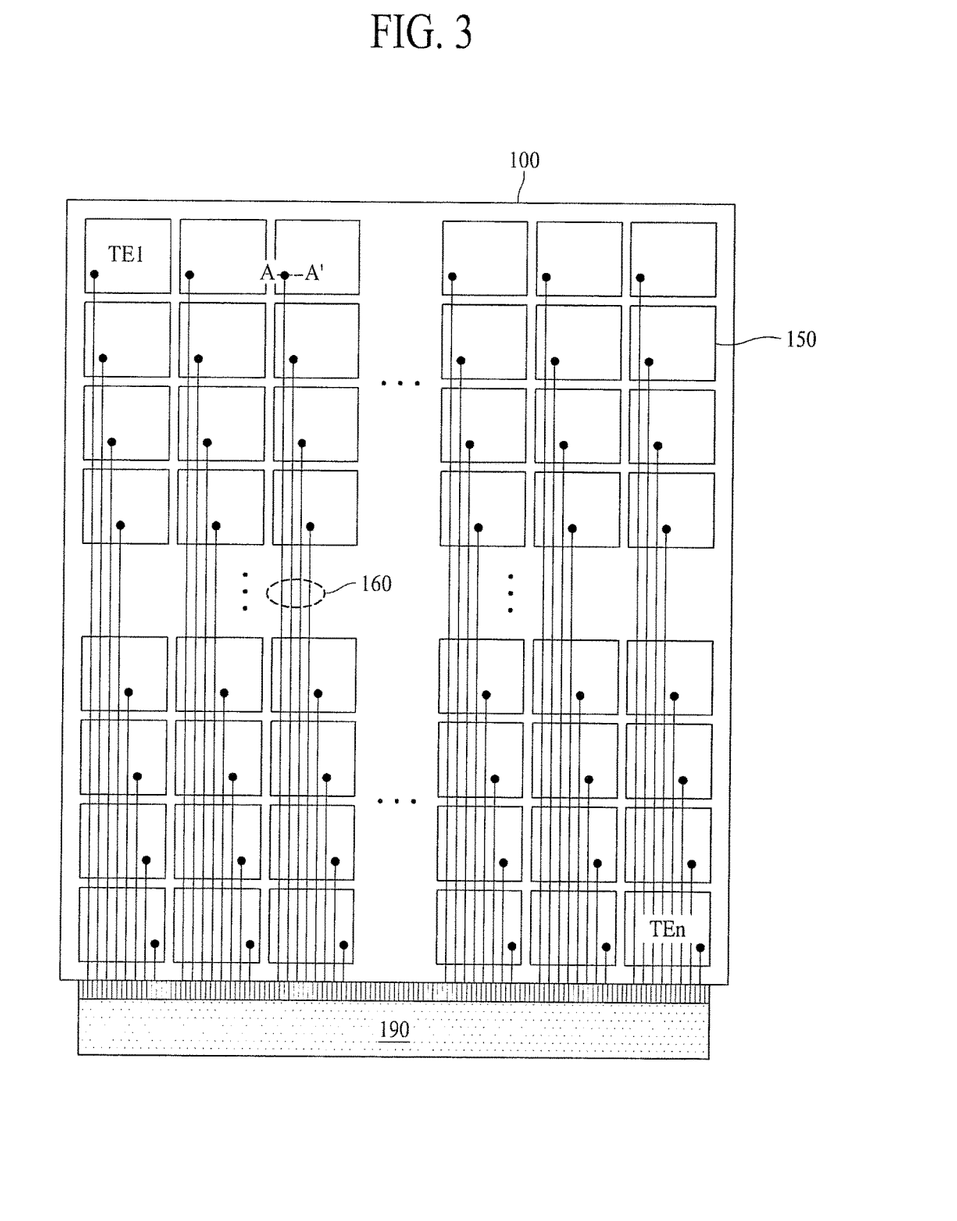
FIG. 3 is an exemplary diagram illustrating a structure where an in-cell touch LCD device according to an embodiment of the present invention is connected to a touch driver.
Figure 4:
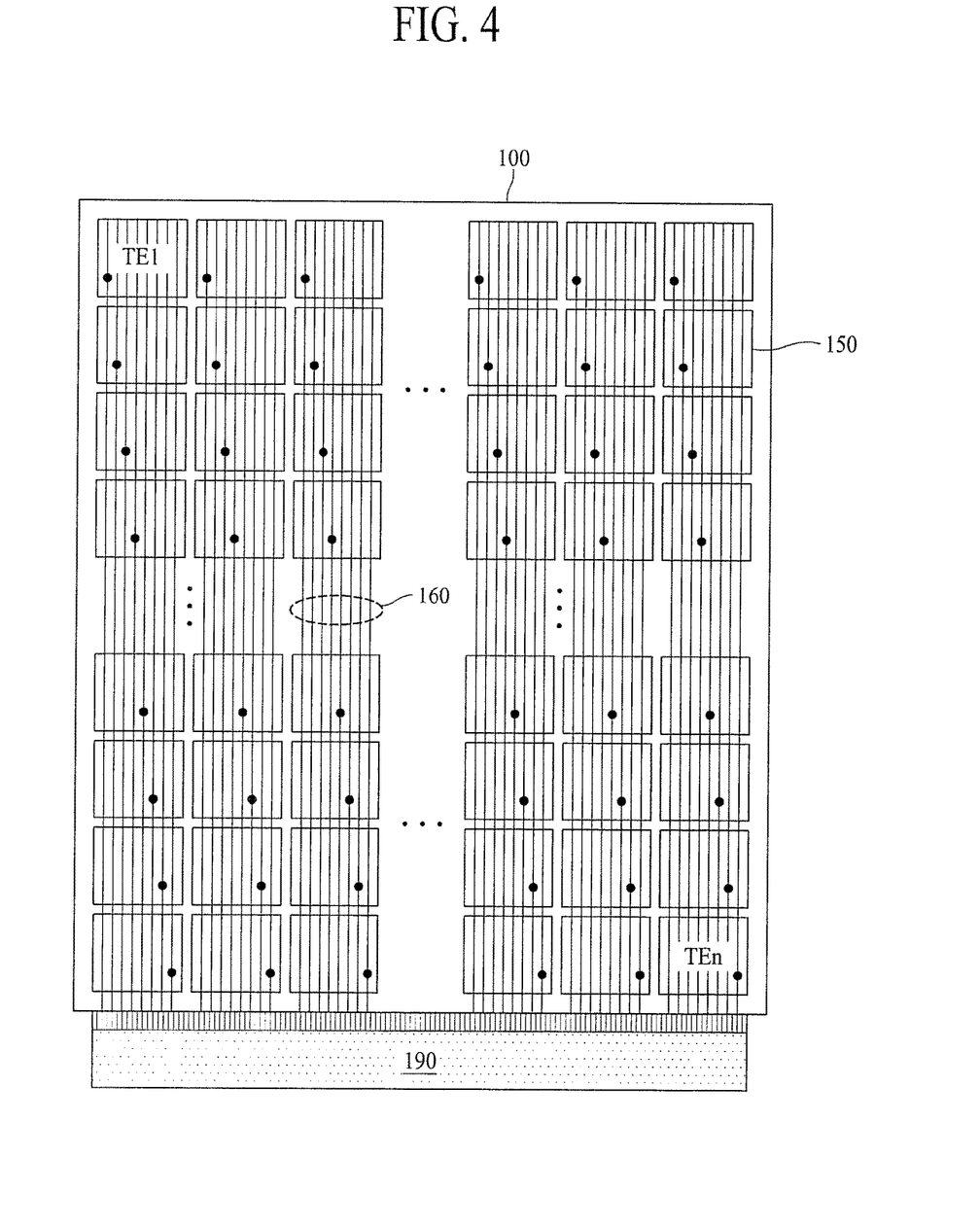
FIG. 4 is another exemplary diagram illustrating a structure where an in-cell touch LCD device according to an embodiment of the present invention is connected to a touch driver.

FIG. 3 is an exemplary diagram illustrating a structure where an in-cell touch LCD device 100 according to an embodiment of the present invention is connected to a touch driver, and FIG. 4 is another exemplary diagram illustrating a structure where the in-cell touch LCD device 100 according to an embodiment of the present invention is connected to a touch driver.

LCD devices are variously classified into a twisted nematic (TN) mode, a vertical alignment (VA) mode, an in-plane switching (IPS) mode, and a fringe field switching (FFS) mode depending on a method of adjusting the alignment of liquid crystal.

In LCD devices based on the TN mode and the VA mode among the modes, a pixel electrode and a common electrode are disposed on a thin film transistor (TFT) array substrate, and the alignment of liquid crystal is adjusted by an electric field generated between the pixel electrode and the common electrode.

In LCD devices based on the IPS mode, a pixel electrode and a common electrode are alternately arranged in parallel, and the alignment of liquid crystal is adjusted by a lateral electric field generated between the pixel electrode and the common electrode.

In LCD devices based on the FFS mode, a pixel electrode and a common electrode are disposed with an insulation layer therebetween and spaced apart from each other. In this case, one of the pixel electrode and the common electrode is formed in a plate shape or a pattern shape, and the other electrode is formed in a finger shape. Also, the alignment of liquid crystal is adjusted by a fringe field generated between the pixel electrode and the common electrode.

The in-cell touch LCD device 100 and the method of manufacturing the same according to an embodiment of the present invention may use a TFT array substrate (hereinafter referred to as a lower substrate) based on the FFS mode. In the in-cell touch LCD device 100 according to an embodiment of the present invention, a touch electrode (hereinafter referred to as a touch sensor) 150 detecting a touch may be embedded into the TFT array substrate.

The in-cell touch LCD device 100 according to an embodiment of the present invention may include the TFT array substrate or may include a color filter array substrate, the TFT array substrate, and a liquid crystal layer. Alternatively, the in-cell touch LCD device 100 according to an embodiment of the present invention may include the TFT array substrate, the color filter array substrate, the liquid crystal layer, and a touch driver 190. Also, the in-cell touch LCD device 100 according to an embodiment of the present invention may further include a backlight unit and a driving circuit unit.

The touch driver 190 may supply a touch driving signal to the touch electrode 150 and may sense a touch by using a sensing signal received from the touch electrode 150.

The driving circuit unit may include a gate driver, a data driver, a timing controller, and a power supply.

Hereinafter, the TFT array substrate will be described as an example of the in-cell touch LCD device 100 according to an embodiment of the present invention.

In the in-cell touch LCD device 100 according to an embodiment of the present invention, the common electrode 150 may be used as the touch electrode TE, and a touch electrode line 160 connected to each of a plurality of the common electrodes TE1 to TEn may be connected to the touch driver 190. In a touch sensing period for sensing a touch, the touch driver 190 may supply the touch driving signal to the common electrodes 150 and may determine whether each of a plurality of the touch electrodes is touched, based on sensing signals received from the touch electrodes. Also, in a display period for displaying an image, the touch driver 190 may supply a common voltage to the common electrodes 150. The touch driver 190 may respectively supply data voltages to a plurality of data lines which are provided in the in-cell touch LCD device 100.

A touch screen having the above-described structure may be referred to as a self-capacitive touch screen, and an LCD device where the common electrode 150 is used as the touch electrode may be referred to as an in-cell type LCD device.

Therefore, the in-cell touch LCD device 100 according an embodiment of the present invention may use a self-capacitance type and an in-cell type.

The common electrodes 150 used as the touch electrodes, as illustrated in FIGS. 3 and 4, may be disposed independently from each other, and each of the common electrodes 150 may be electrically connected to the touch driver 190 through the touch electrode line 160.

A plurality of the touch electrode lines 160 that electrically connect the common electrodes 150 to the touch driver 190 may be provided in a display area of the in-cell touch LCD device 100, and particularly, may be arranged to overlap the data lines.

In this case, the data lines may be disposed in an area through which light is not transmitted. That is, a transmission part in the display area is not affected by the touch electrode lines 160. Also, an area of a bezel surrounding the display area is enlarged by the touch electrode lines 160.

In the in-cell touch LCD device 100, as illustrated in FIG. 3, the touch electrode line 160 may be disposed from a portion, connected to the common electrode 150, to a portion (i.e., a lower end of the display area) where the touch driver 190 is disposed.

As another example, as illustrated in FIG. 4, the touch electrode line 160 may be disposed from an upper end to a lower end of the display area. If the touch electrode line 160 is disposed from the upper end to the lower end of the display area, a capacitance value based on routing of the touch electrode line 160 becomes uniform, and thus, an accuracy of touch sensing is enhanced.

The in-cell type applied to the present invention may be referred to as, particularly, an advanced in-cell touch (AIT) type.

In the in-cell touch LCD device 100 based on the AIT type according to an embodiment of the present invention, as described above, the common electrodes 150 may be used as the touch electrodes and may be disposed independently from each other, and the touch electrode lines 160 that electrically connect the common electrodes 150 to the touch driver 190 may be disposed in the display area, and particularly, may be arranged to overlap the data lines. The above-described structure will be described in detail with reference to FIGS. 5 to 17.

Moreover, in the in-cell touch LCD device 100 based on the AIT type, in the touch sensing period, the touch driver 190 may supply the touch driving signal to the common electrode 150, receive a sensing signal from the common electrode 150, and determine whether the common electrode 150 is touched, based on the received sensing signal.

In the display period, the touch driver 190 may supply the common voltage to the common electrode 150, thereby allowing the in-cell touch LCD device 100 to display an image.

Moreover, in the in-cell touch LCD device 100 according to an embodiment of the present invention, the common electrode 150 may be disposed on the pixel electrode, and liquid crystal may be disposed on the common electrode. Such a type may be referred to as a common electrode top (Vcom top) type.

Figure 5:
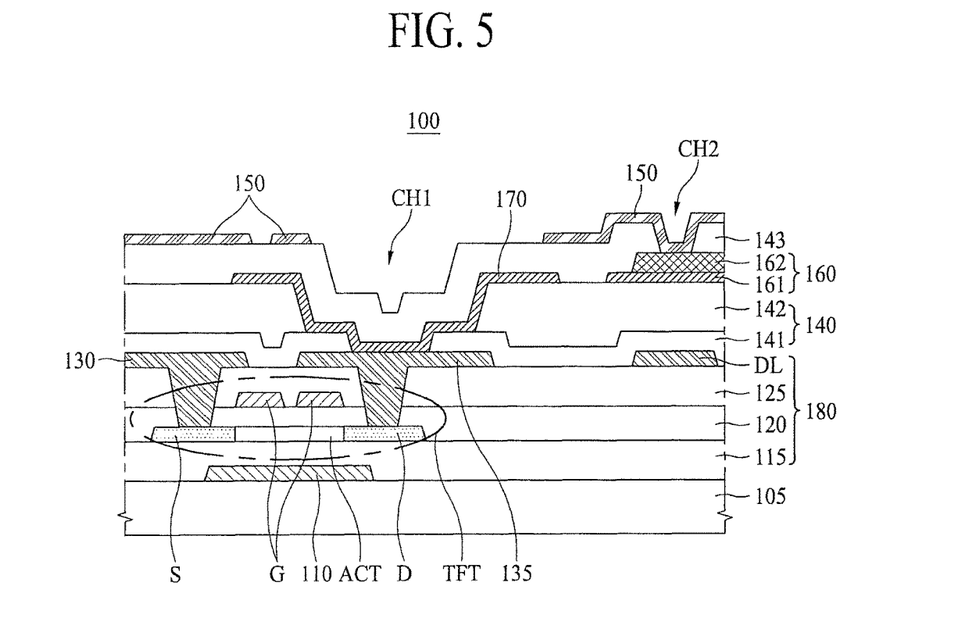
FIG. 5 is an exemplary diagram illustrating a cross-sectional surface of an in-cell touch LCD device according to an embodiment of the present invention.
Figure 6:
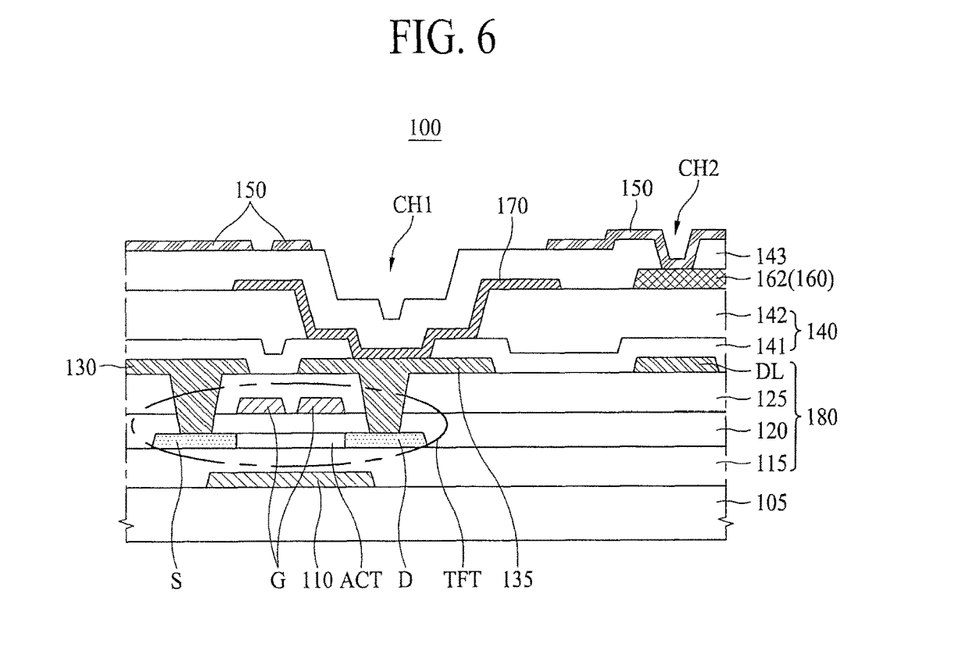
FIG. 6 is another exemplary diagram illustrating a cross-sectional surface of an in-cell touch LCD device according to an embodiment of the present invention.

FIG. 5 is an exemplary diagram illustrating a cross-sectional surface of an in-cell touch LCD device 100 according to an embodiment of the present invention and illustrates a cross-sectional surface taken along line A-A' of FIG. 3. Also, FIG. 5 is an exemplary diagram illustrating a cross-sectional surface of one of a plurality of pixels provided in the display area of the in-cell touch LCD device 100. FIG. 6 is another exemplary diagram illustrating a cross-sectional surface of an in-cell touch LCD device 100 according to an embodiment of the present invention. A bridge contact part 161 illustrated in FIG. 5 is not provided in the cross-sectional surface of the in-cell touch LCD device 100 illustrated in FIG. 6.

As described above, the in-cell touch LCD device 100 according to an embodiment of the present invention may include the TFT array substrate, and FIG. 5 illustrates a cross-sectional surface of a pixel disposed on the TFT array substrate. Particularly, FIG. 5 illustrates a cross-sectional surface of a TFT array substrate based on the FFS mode. Also, a TFT array substrate based on the common electrode top type where a common electrode 150 is disposed on a pixel electrode 170 is illustrated in FIG. 5.

Hereinafter, the TFT array substrate illustrated in FIG. 5 will be described as an example of the in-cell touch LCD device 100 according to an embodiment of the present invention.

The in-cell touch LCD device 100, as illustrated in FIG. 5, may include: a pixel driver 180 that includes a thin film transistor TFT provided in each of a plurality of pixels; a passivation part 140 that protects the pixel driver 180; a pixel electrode 170 that is disposed on the passivation part 140 and connected to a first electrode 135 of the thin film transistor TFT; a touch electrode line 160 that is disposed on the passivation part 140 and insulated from the pixel electrode 170; a cover part 143 that covers the pixel electrode 170 and the touch electrode line 160; and a common electrode 150 that is disposed on the cover part 143, connected to the touch electrode line 160 via the cover part 143, and supplied with a common voltage or a touch driving signal from the touch driver 190 connected to the touch electrode line 160. Also, although not shown, a plurality of gate lines and a plurality of data lines may be provided to intersect each other in the in-cell touch LCD device 100. The plurality of pixels may be defined by the plurality of gate lines and the plurality of data lines. The thin film transistor TFT and a storage capacitor may be provided in each of the pixels.

First, the pixel driver 180 may be disposed on a base substrate 105. The pixel driver 180 may include a light shield layer 110, a buffer layer 115, an active layer ACT, a first electrode D, a second electrode S, a gate insulator 120, a gate electrode G, an interlayer dielectric (ILD) 125, a first contact part 135, a second contact part 130, and a data line DL.

The active layer ACT, the first electrode D, the second electrode S, the gate insulator 120, the gate electrode G, the interlayer dielectric (ILD) 125, the first contact part 135, and the second contact part 130 may configure the thin film transistor TFT.

A material of the active layer ACT may use low temperature poly silicon (LTPS).

A thin film transistor including an active layer ACT formed of the low temperature poly silicon LTPS has a charge mobility higher than that of a thin film transistor including amorphous silicon (a-Si) and thus is suitable for a high-resolution display device requiring a fast response time.

For example, an electron mobility of the active layer ACT including the LTPS may be 10 $cm^2$/Vsec or more.

The first electrode D may be a source electrode or may be a drain electrode. The second electrode D may be a drain electrode or may be a source electrode. Hereinafter, the first electrode D may be referred to as a drain electrode, and the second electrode S may be referred to as a source electrode.

Therefore, the first contact part 135 connected to the drain electrode D may be referred to as a drain contact part, and the second contact part 130 connected to the source electrode S may be referred to as a source contact part.

The data line DL, through which a data voltage is supplied to the source electrode S of the thin film transistor TFT, may be disposed on the same layer as the drain electrode D.

Second, the passivation part 140 may include a first passivation layer 141 and a second passivation layer 142 disposed on the first passivation layer 141. The first passivation layer 141 may cover and protect the thin film transistor TFT, the drain electrode (or the first electrode) D, the source electrode (or the second electrode) S of the thin film transistor TFT, and the data line DL through which the data voltage is supplied to the source electrode S.

Third, the pixel electrode 170 may be disposed on the passivation part 140 and may be connected to the drain electrode D via the second passivation layer 142 and the first passivation layer 141.

Fourth, as illustrated in FIG. 5, the touch electrode line 160 may include a bridge contact part 161, which is disposed on the passivation part 140 and is formed simultaneously with the pixel electrode 170, and a conductive line 162 that is disposed on the bridge contact part 161 and is connected to the common electrode 150 via the cover part 143. The bridge contact part 161 or the conductive line 162 may be connected to the touch driver 190.

However, as illustrated in FIG. 6, the touch electrode line 160 may be configured with only the conductive line 162. In this case, the touch electrode line 160 (i.e., the conductive line 162) may be disposed on the same layer as a layer on which the pixel electrode 170 is disposed, insulated from the pixel electrode 170, formed of a material greater in conductivity than the pixel electrode 170, connected to the common electrode 150 via the cover part 143, and connected to the touch driver 190.

To provide an additional description, as illustrated in FIG. 6, the conductive line 162 may be disposed directly on the passivation part 140, and thus, the touch electrode line 160 may be formed. However, in order to increase an adhesive force of the conductive line 162, as illustrated in FIG. 5, the conductive line 162 may be disposed on the bridge contact part 161 formed of the same material as that of the pixel electrode 170. The adhesive force of the conductive line 162 is better in a case, where the conductive line 162 is disposed on the bridge contact part 161, than a case where the conductive line 162 is disposed on the passivation part 140.

The touch electrode line 160 may overlap the data line DL with the passivation part 140 therebetween.

Fifth, the cover part 143 may cover the pixel electrode 170 and the touch electrode line 160. Hereinafter, the cover part 143 may be referred to as a third passivation layer.

Sixth, the common electrode 150 may be disposed on the cover part 143, connected to the touch electrode line 160 via the cover part 143, and supplied with the common voltage or the touch driving signal from the touch driver 190 connected to the touch electrode line 160.

The elements will be described below in detail.

The light shield layer 110 may be disposed in a portion, corresponding to the active layer ACT of the thin film transistor TFT, on the base substrate 105. The light shield layer 110 may be formed of opaque metal, thereby preventing light from being irradiated onto the active layer ACT. The light shield layer 110 may be formed of molybdenum (Mo), aluminum (Al), and/or the like and may have a thickness of 500 Å to 1,000 Å.

The buffer layer 115 may be formed on the light shield layer 110. The buffer layer 115 may be formed of $SiO_2$, SiNx, and/or the like and may have a thickness of 2,000 Å to 3,000 Å.

The active layer ACT, the source electrode S, and the drain electrode D of the thin film transistor TFT may be disposed in a region, overlapping the light shield layer 110, on the buffer layer 115.

The gate insulator 120 may be disposed to cover the active layer ACT, the source electrode S, and the drain electrode D. The gate insulator 120 may be formed of $SiO_2$ and/or the like and may have a thickness of 1,000 Å to 1,500 Å.

The gate insulator 120 may be formed by depositing tetra ethyl ortho silicate (TEOS) or middle temperature oxide (MTO) through a chemical vapor deposition (CVD) process.

The gate electrode G may be disposed in a region, overlapping the active layer ACT, on the gate insulator 120. In this case, the gate electrode G may be formed of molybdenum (Mo), aluminum (Al), and/or the like and may have a thickness of 2,000 Å to 3,000 Å. In this manner, the thin film transistor TFT may be configured with the active layer ACT, the source electrode S, and the drain electrode D, which are disposed under the gate insulator 120, and the gate electrode G disposed on the gate insulator 120. Here, the thin film transistor TFT may be formed in a coplanar top gate structure.

The interlayer dielectric 125 may be disposed to cover the gate insulator 120 and the thin film transistor TFT. The interlayer dielectric 125 may be formed of $SiO_2$, SiNx, and/or the like and may have a thickness of 3,000 Å to 6,000 Å. As another example, the interlayer dielectric 125 may be formed in a structure where $SiO_2$ (or SiNx) is stacked to a thickness of 3,000 Å to 6,000 Å.

The source contact part 130, connected to the source electrode S of the thin film transistor TFT via the gate insulator 120 and the interlayer dielectric 125, may be provided. Also, the drain contact part 135 connected to the drain electrode D of the thin film transistor TFT via the gate insulator 120 and the interlayer dielectric 125 may be provided.

The source contact part 130 and the drain contact part 135 may each be formed in a multi-layer structure where Mo/Al/Mo is stacked. The source contact part 130 may be connected to the data line DL, and the drain contact part 135 may be connected to the pixel electrode 170.

The first passivation layer (PAS1) 141 may be disposed to cover the interlayer dielectric 125, the source contact part 130, and the drain contact part 135. The first passivation layer 141 may be formed of $SiO_2$, SiNx, and/or the like and may have a thickness of 1,000 Å to 2,000 Å.

The second passivation layer (PAS2) 142 may be disposed to cover the first passivation layer 141. The second passivation layer 142 may be formed of photo acryl and may have a thickness of 2.0 μm to 3.0 μm.

The pixel electrode 170 may be disposed on the second passivation layer 142. The pixel electrode 170 may be formed of a transparent conductive material such as indium tin oxide (ITO), indium zinc oxide (IZO), indium tin zinc oxide (ITZO), or the like and may have a thickness of 500 Å to 1,500 Å.

The touch electrode line 160 may be disposed on the second passivation layer 142. That is, the touch electrode line 160 may be disposed in a portion, corresponding to the data line DL and the common electrode 150, on the second passivation layer 142.

The bridge contact part 161 included in the touch electrode line 160 may include a material which is the same as that of the pixel electrode 170, and may be formed through the same process simultaneously with the pixel electrode 170.

The conductive line 162 included in the touch electrode line 160, as illustrated in FIG. 5, may be disposed on the bridge contact part 161 and as illustrated in FIG. 6, may be disposed directly on the second passivation layer 142.

The conductive line 162 may be electrically connected to the common electrode 150. The conductive line 162 may be formed of Mo, Al, and/or the like and may have a thickness of 1,000 Å to 4,000 Å. The conductive line 162 may be formed in a multi-layer structure where Mo/Al/Mo is stacked. Also, the conductive line 162 may be formed in a structure where Ti/Al/Ti is stacked.

The conductive line 162 may be disposed to overlap the data line DL. The conductive line 162 may overlap all data lines respectively corresponding to a red pixel, a green pixel, and a blue pixel, or may overlap some data lines.

For example, when a column spacer is disposed on the data line corresponding to the red pixel, the conductive line 162 may be disposed to overlap the data line corresponding to the green pixel and the data line corresponding to the blue pixel. However, the present embodiment is not limited thereto. In other embodiments, the conductive line 162 may be disposed to overlap all the data lines respectively corresponding to the red pixel, the green pixel, and the blue pixel.

The conductive line 162 may not electrically be connected to the common electrodes 150 respectively provided in all the pixels. FIGS. 5 and 6, as illustrated in FIG. 3, illustrate a cross-sectional surface of an area where the touch electrode line 160 is electrically connected to the common electrode 150. Therefore, in FIGS. 5 and 6, the conductive line 162 may be electrically connected to the common electrode 150. In FIG. 3, in a cross-sectional view of an area where the touch electrode line 160 is not connected to the common electrode 150, the conductive line 162 may not electrically be connected to the common electrode 150.

A third passivation layer (PASS) 143 may be disposed to cover the pixel electrode 170 and the touch electrode line 160. The third passivation layer (PAS3) 143 may be formed of $SiO_2$, SiNx, and/or the like and may have a thickness of 1,000 Å to 3,000 Å.

A first contact hole CH1 may be formed by removing a portion of each of the first to third passivation layers 141 to 143 corresponding to the drain contact part 135.

The common electrode 150 may be disposed on the third passivation layer 143. The common electrode 150 may be formed of a transparent conductive material such as indium tin oxide (ITO), indium zinc oxide (IZO), indium tin zinc oxide (ITZO), or the like and may have a thickness of 500 Å to 1,500 Å. The common electrode 150 may be disposed in a finger shape, and thus, a fringe field may be generated between the common electrode 150 and the pixel electrode 170. In this case, the pixel electrode 170 may be formed in a plate shape.

A second contact hole CH2 may be formed by removing a portion of the third passivation layer 143 on the pixel electrode 170. The second contact hole CH2 may be formed in an area where the touch electrode line 160 overlaps the data line DL. The touch electrode line 160 may be electrically connected to the common electrode 150 through the second contact hole CH2.

The touch electrode line 160, as illustrated in FIG. 3, may be connected to only the common electrode 150 formed in one of a plurality of pixels covered by one touch electrode 150, but the touch electrode line 160 may be electrically connected to the common electrode 150 in two or more of the plurality of pixels covered by the one touch electrode 150. The touch electrode line 160 may be disposed on the data line DL in the in-cell touch LCD device.

The touch electrode line 160 may be disposed in a bar shape in a direction from an upper portion to a lower portion of the in-cell touch LCD device. Referring to FIGS. 3 and 4, a plurality of the touch electrode lines 160 connected to the common electrode 150 may be connected to channels of the touch driver 190, respectively.

The common voltage or the touch driving signal may be supplied to the common electrode 150 through the touch electrode line 160. In the display period, the common voltage may be supplied to the common electrode 150 through the touch electrode line 160. In the touch sensing period, the touch driving signal may be supplied to the common electrode 150 through the touch electrode line 160. The touch driver 190 may supply the touch driving signal and then may sense a capacitance, generated in the common electrode 150, through the touch electrode line 160 to determine whether there is a touch and detect a touched position.

In the in-cell touch LCD device according to the embodiments of the present, since the common electrode 150 is disposed on the pixel electrode, a transmittance is further enhanced than an in-cell touch LCD device in which the pixel electrode is disposed on the common electrode.

That is, a transmittance of light in a boundary area between the red, green, and blue pixels is higher in an in-cell touch LCD device, where the common electrode is disposed on the pixel electrode, than an in-cell touch LCD device where the pixel electrode is disposed on the common electrode.

Moreover, since a transmittance is enhanced, the number of light emitting diodes (LEDs) used as a light source of a backlight unit is reduced, and thus, the number of optical sheets is reduced.

FIGS. 7 to 17 are exemplary diagrams illustrating a method of manufacturing an in-cell touch LCD device according to an embodiment of the present invention, and particularly, illustrate a method of manufacturing the in-cell touch LCD device illustrated in FIG. 5.

The method of manufacturing an in-cell touch LCD device according to an embodiment of the present invention may include: forming (see FIGS. 7 to 11) the pixel driver 180, including the thin film transistor TFT, in each of a plurality of pixels; covering (see FIGS. 12 and 13) the pixel driver 180 with the passivation part 140; forming (see FIG. 14) the pixel electrode 170, connected to the drain electrode (or the first electrode 135) D of the thin film transistor TFT via the passivation part 140, on the passivation part 140; forming (see FIGS. 14 and 15) the touch electrode line 160, insulated from the pixel electrode 170, on the passivation part 140; covering (see FIG. 16) the pixel electrode 170 and the touch electrode line 160 with the cover part 143; and forming (see FIG. 17) the common electrode 150, connected to the touch electrode line 160 via the cover part 143 and supplied with the common voltage or the touch driving signal from the touch driver 190 connected to the touch electrode line 160, on the cover part 143.

The operations will be described below in detail.

Figure 7:
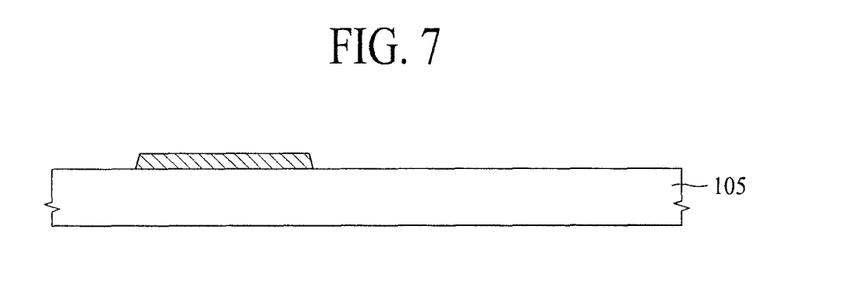
FIGS. 7 to 17 are exemplary diagrams illustrating a method of manufacturing an in-cell touch LCD device according to an embodiment of the present invention.

First, referring to FIG. 7, a metal layer may be formed by coating a metal material, which blocks light like Mo, on the base substrate 105.

Subsequently, the light shield layer 110 may be formed in a TFT area by patterning the metal layer through a photolithography process and a wet etching process using a first mask. The light shield layer 110 may be formed to a thickness of 500 Å to 1,000 Å and may be aligned with the active layer ACT of the thin film transistor TFT formed in a subsequent process.

The base substrate 105 may be formed of a glass substrate or may be formed of a plastic substrate.

Figure 8:
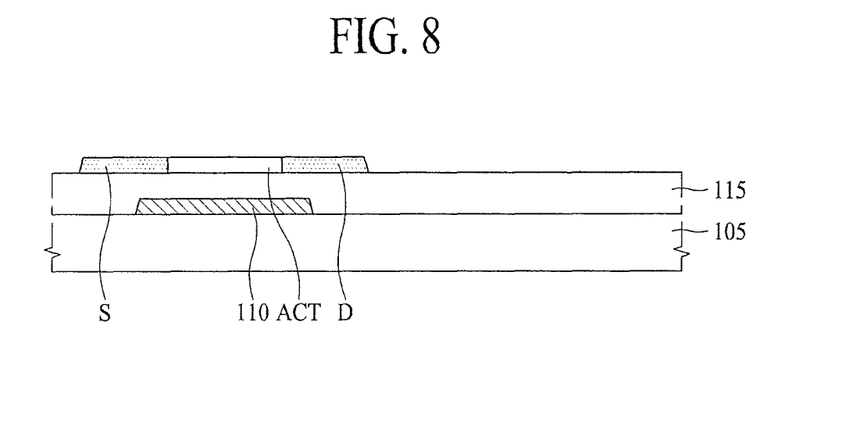

Subsequently, referring to FIG. 8, the buffer layer 115 may be formed of an inorganic material (for example, $SiO_2$ or SiNx) on the base substrate 105 to cover the light shield layer 110. The buffer layer 115 may have a thickness of 2,000 Å to 3,000 Å.

Subsequently, a semiconductor layer may be formed by depositing a low temperature poly silicon LTPS on the buffer layer 115.

Subsequently, an active layer ACT may be formed in an area overlapping the light shield layer 110 by patterning the semiconductor layer through a photolithography process and a dry etching process using a second mask. The active layer ACT may have a thickness of 500 Å to 1,500 Å.

Figure 9:
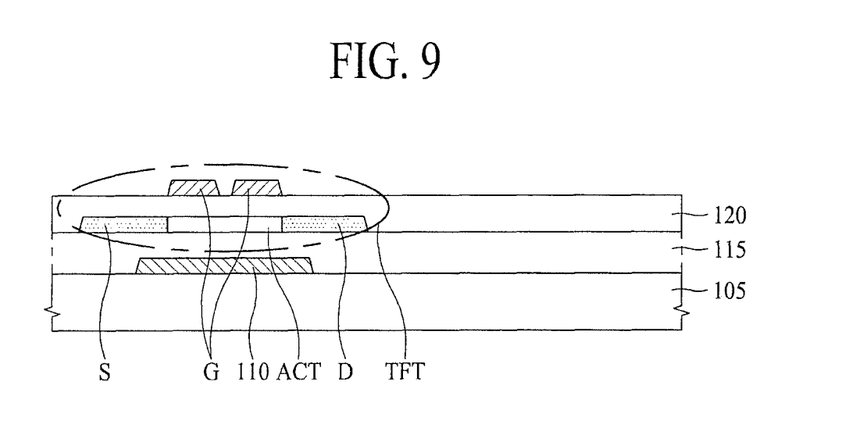

Subsequently, referring to FIG. 9, the gate insulator 120 may be formed on the buffer layer 115 to cover the active layer ACT. The gate insulator 120 may be formed of $SiO_2$ and/or the like and may have a thickness of 1,000 Å to 1,500 Å.

The gate insulator 120 may be formed by depositing tetra ethyl ortho silicate (TEOS) or middle temperature oxide (MTO) through a chemical vapor deposition (CVD) process.

Subsequently, a metal material may be deposited on the gate insulator 120, and then, the gate electrode G of the thin film transistor TFT may be formed by patterning the metal material through a photolithography process and an etching process using a third mask.

The gate electrode G may be formed of molybdenum (Mo), aluminum (Al), and/or the like to have a thickness of 2,000 Å to 3,000 Å. The gate electrode G may be formed in a region, overlapping the active layer ACT, on the gate insulator 120. The gate electrode G may be formed of the same material along with the gate line.

The source electrode S and the drain electrode D of the thin film transistor TFT may be formed by doping high-concentration P-type or N-type impurities on an outer portion of the active layer ACT by using the gate electrode G as a mask.

Here, a wet etching process and a dry etching process may be performed in forming the gate electrode G, and in this case, high-concentration N-type impurities (or P-type impurities) may be doped on the active layer ACT between the wet etching process and the dry etching process.

The thin film transistor TFT may be configured with the active layer ACT, the source electrode S, and the drain electrode D, which are disposed under the gate insulator 120, and the gate electrode G disposed on the gate insulator 120. Here, the thin film transistor TFT may be formed in a coplanar top gate structure.

Figure 10:
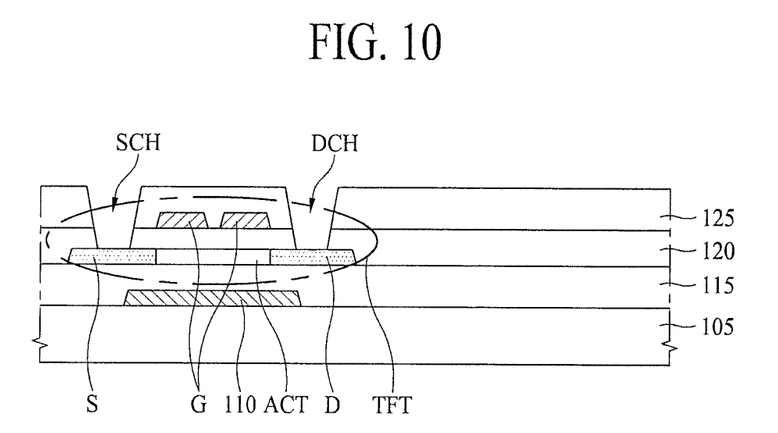

Subsequently, referring to FIG. 10, the interlayer dielectric 125 may be disposed by depositing an insulating material to cover the gate insulator 120 and the thin film transistor TFT. The interlayer dielectric 125 may be formed of $SiO_2$, SiNx, and/or the like and may have a thickness of 3,000 Å to 6,000 Å. As another example, the interlayer dielectric 125 may be formed in a structure where $SiO_2$ (or SiNx) is stacked to a thickness of 3,000 Å to 6,000 Å.

Subsequently, a portion of each of the gate insulator 120 and the interlayer dielectric 125 overlapping the source electrode S of the thin film transistor TFT may be removed by performing an etching process using a fourth mask, thereby forming a source contact hole SCH exposing the source electrode S of the thin film transistor TFT. Simultaneously, a portion of each of the gate insulator 120 and the interlayer dielectric 125 overlapping the drain electrode D of the thin film transistor TFT may be removed, thereby forming a drain contact hole DCH exposing the drain electrode D of the thin film transistor TFT.

Figure 11:
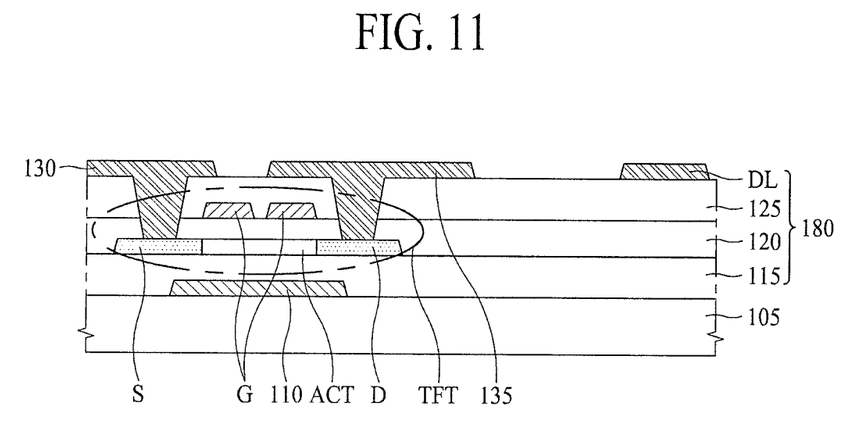

Subsequently, referring to FIG. 11, a metal layer may be formed by coating a metal material on the interlayer dielectric 125.

Subsequently, the plurality of data lines DL through which the data voltages are respectively supplied to the plurality of pixels may be formed by patterning the metal layer through a photolithography process and an etching process using a fifth mask. Simultaneously, the source contact part 130 may be formed by filling a metal material into the source contact hole SCH, and the drain contact part 135 may be formed by filling a metal material into the drain contact hole DCH. That is, the data lines DL, the source contact part 130, and the drain contact part 135 may be formed through the same process.

The data lines DL, the source contact part 130, and the drain contact part 135 may each be formed of molybdenum (Mo), aluminum (Al), and/or the like and may have a thickness of 2,000 Å to 3,000 Å.

Figure 12:
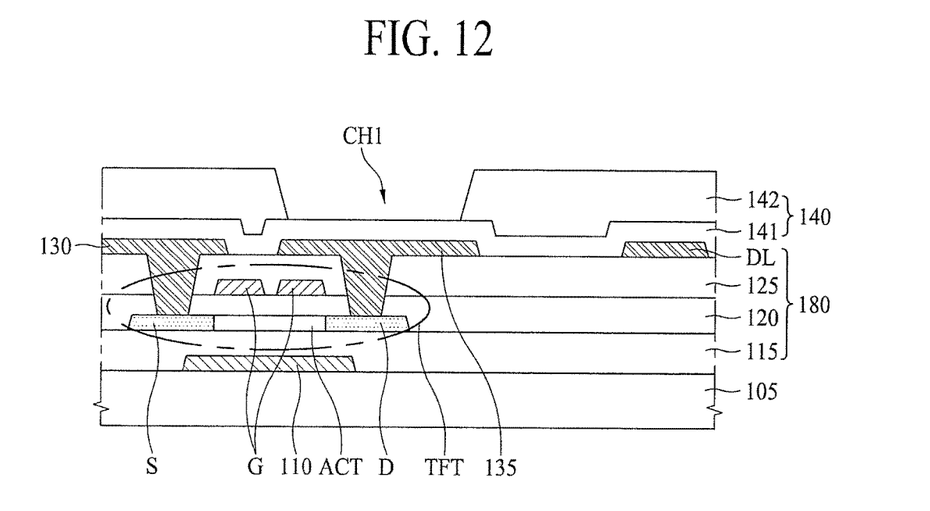

Subsequently, referring to FIG. 12, the first passivation layer 141 may be formed on the interlayer dielectric 125. The first passivation layer 141 may be disposed to cover the interlayer dielectric 125, the source contact part 130, and the drain contact part 135. The first passivation layer 141 may be formed of $SiO_2$, SiNx, and/or the like and may have a thickness of 1,000 Å to 2,000 Å.

A portion of the second passivation layer 142 corresponding to the drain contact part 135 may be etched by performing a process using a sixth mask. The first contact hole CH1 may be formed by using the sixth mask. The first passivation layer 141 may be exposed to the outside through the first contact hole CH1 by using the sixth mask.

Figure 13:
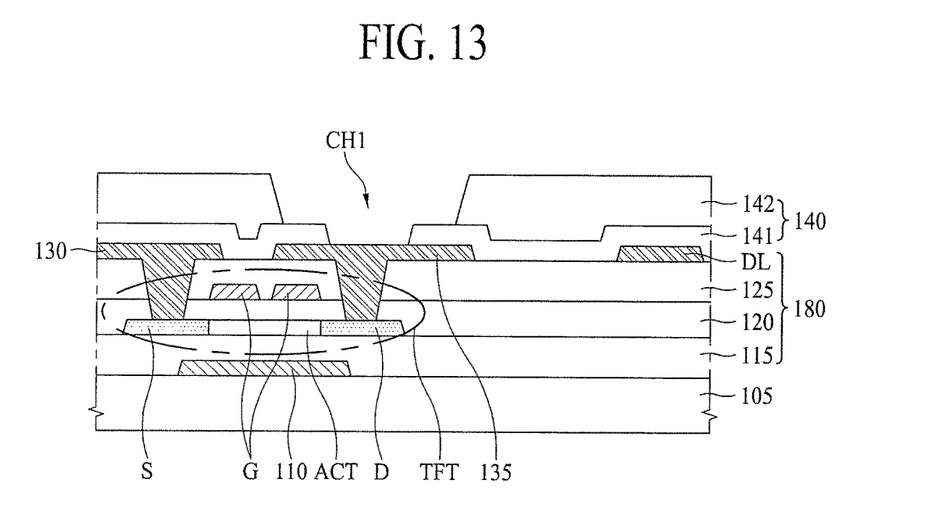

Subsequently, referring to FIG. 13, the drain contact part 135 may be exposed to the outside by etching the portion of the first passivation layer 141 exposed through the first contact hole CH1 with a seventh mask.

Figure 14:
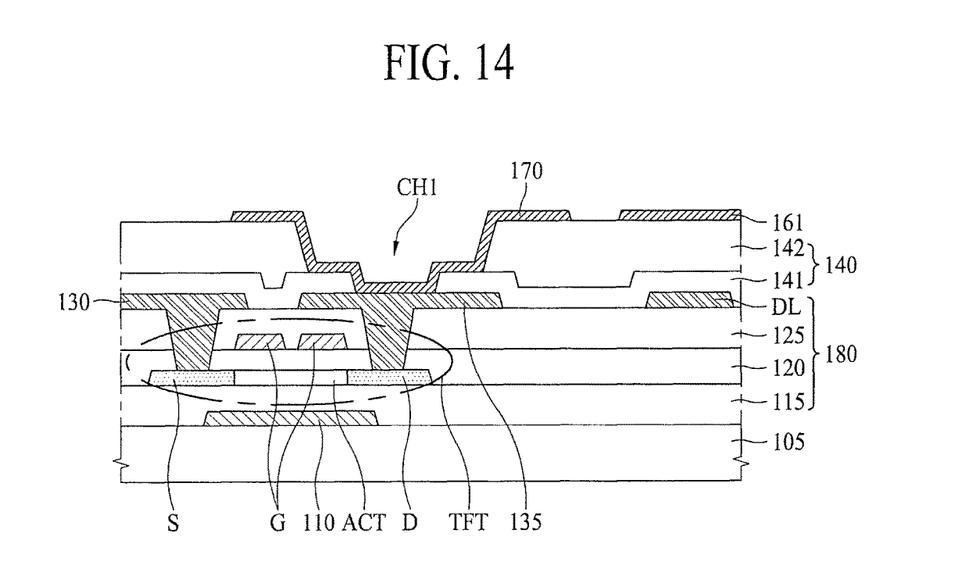

Subsequently, referring to FIG. 14, a transparent conductive material may be coated on the second passivation layer 142. Subsequently, the pixel electrode 170 and the bridge contact part 161 may be formed on the second passivation layer 142 by performing a photolithography process and an etching process using an eighth mask.

The pixel electrode 170 and the bridge contact part 161 may each be formed of a transparent conductive material such as indium tin oxide (ITO), indium zinc oxide (IZO), indium tin zinc oxide (ITZO), or the like and may have a thickness of 500 Å to 1,500 Å.

Figure 15:
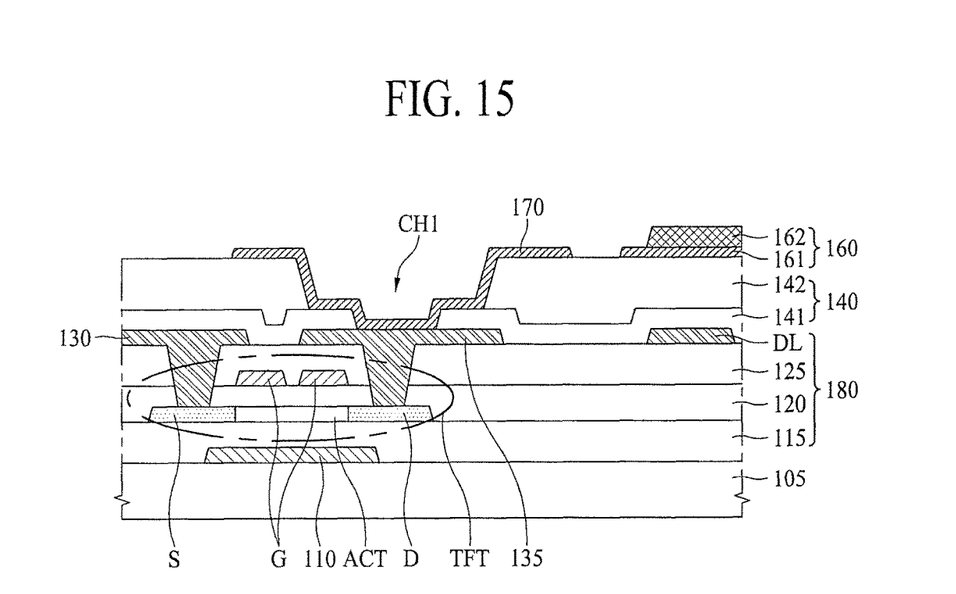

Subsequently, referring to FIG. 15, a metal material may be formed to cover the pixel electrode 170 and the bridge contact part 161.

Subsequently, the conductive line 162 may be formed by performing a photolithography process and an etching process using a ninth mask.

The conductive line 162 may be formed of Mo, Al, and/or the like and may have a thickness of 1,000 Å to 4,000 Å. The conductive line 162 may be formed in a multi-layer structure where Mo/Al/Mo is stacked. Also, the conductive line 162 may be formed in a structure where Ti/Al/Ti is stacked.

The conductive line 162 may be disposed to overlap the data line DL. The conductive line 162 may overlap all the data lines respectively corresponding to the red pixel, the green pixel, and the blue pixel. That is, the conductive line 162 may be disposed to overlap at least one of the data lines respectively corresponding to the red pixel, the green pixel, and the blue pixel.

Figure 16:
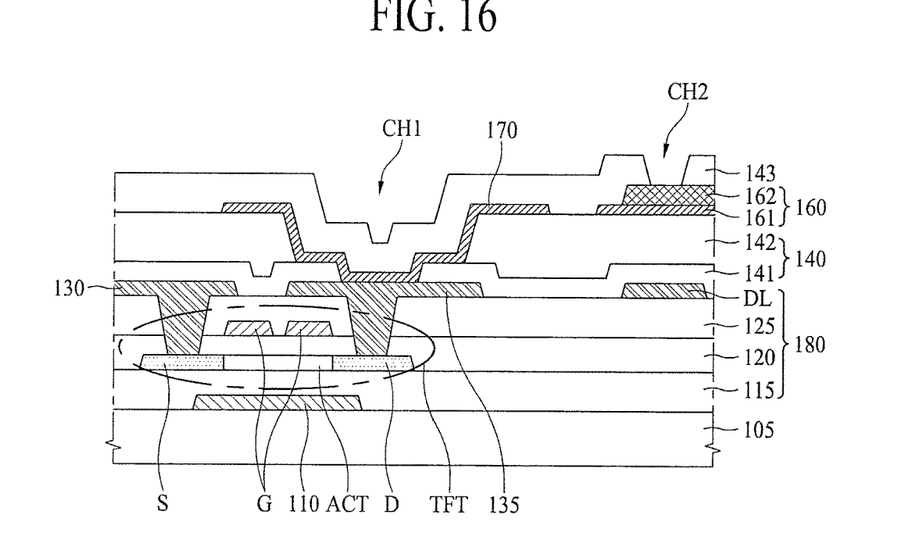

Subsequently, referring to FIG. 16, the third passivation layer 143 may be formed to cover the pixel electrode 170, the bridge contact part 161, and the conductive line 162. The third passivation layer 143 may be formed of $SiO_2$, SiNx, and/or the like and may have a thickness of 1,000 Å to 3,000 Å.

Subsequently, the second contact hole CH2 exposing the conductive line 162 may be formed in the third passivation layer 143 by performing a photolithography process and an etching process using a tenth mask.

Figure 17:
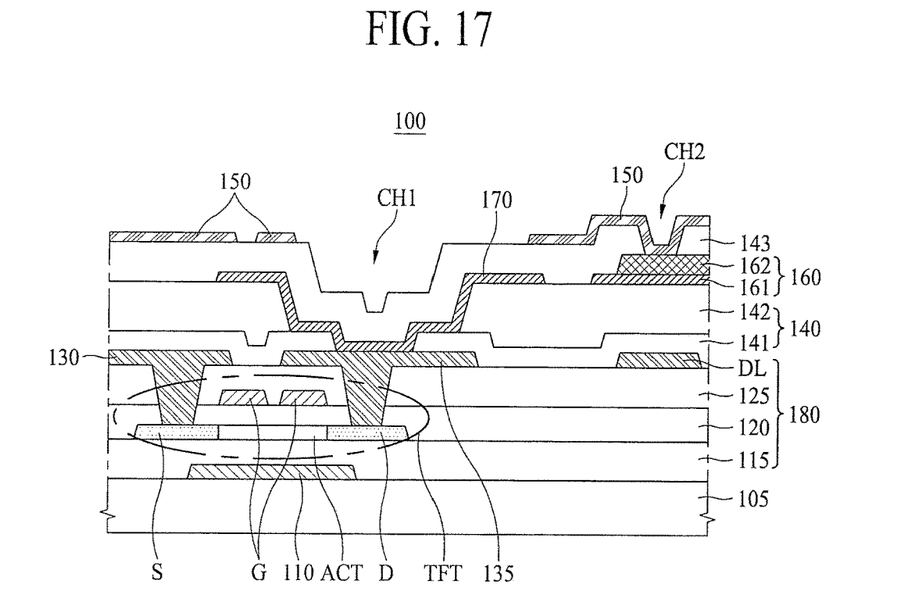

Subsequently, referring to FIG. 17, a transparent conductive material may be coated on the third passivation layer 143.

Finally, the common electrode 150 may be formed on the passivation layer 143 and in the second contact hole CH2 by performing a photolithography process and an etching process using an eleventh mask.

The common electrode 150 may be connected to the conductive line 162 in the second contact hole CH2.

The common electrode 150 may be formed of a transparent conductive material such as indium tin oxide (ITO), indium zinc oxide (IZO), indium tin zinc oxide (ITZO), or the like and may have a thickness of 500 Å to 1,500 Å.

The common electrode 150 may be formed in a finger shape, and a fringe field may be generated between the pixel electrode 170 having a plate shape and the common electrode 150 having a finger shape.

Hereinabove, the method of manufacturing the in-cell touch CLD device according to an embodiment of the present invention has been described with reference to the in-cell touch LCD device illustrated in FIG. 5. Except for a feature where the conductive line 162 is formed directly on the second passivation layer 142 configuring the passivation part 140, the in-cell touch LCD device illustrated in FIG. 6 may be manufactured in the method described above with reference to FIGS. 7 to 17.

However, as illustrated in FIG. 6, when the conductive line 162 is formed directly on the passivation part 140, the first passivation layer 141 and the second passivation layer 142 included in the passivation layer 140 may be switched in their disposed positions, for increasing an adhesive force between the conductive line 162 and the passivation layer 140.

For example, in FIG. 6, the second passivation layer 142 may be deposited on the first passivation layer 141, but is not limited thereto. In other embodiments, the first passivation layer 141 may be deposited on the second passivation layer 142, and then, the pixel electrode 170 and the conductive line 162 may be provided on the first passivation layer 141.

In this case, the second passivation layer 142 may cover the interlayer dielectric 125, the source contact part 130, and the drain contact part 135. The second passivation layer 142 may be formed of photo acryl and may have a thickness of 2.0 μm to 3.0 μm. Also, the first passivation layer 141 may be disposed on the second passivation layer 141. The first passivation layer 141 may be formed of $SiO_2$, SiNx, and/or the like and may have a thickness of 1,000 Å to 2,000 Å.

An adhesive force between the conductive line 162 and the first passivation layer 141 formed of $SiO_2$ or SiNx is better than an adhesive force between the conductive line 162 and the second passivation layer 142 formed of photo acryl. Therefore, although the conductive line 162 is disposed directly on the passivation part 140, a defect where the conductive line 162 is detached from the passivation part 140 cannot occur.

Moreover, since the bridge contact part 161 may be omitted, a transmittance of the in-cell touch LCD device is enhanced.

Features of the present invention will be briefly described below.

According to the embodiments of the present invention, the common electrode may has the common electrode top structure where the common electrode is disposed on the pixel electrode, the touch electrode line 160 for realizing a touch function may be provided, and the self-capacitance type may be used.

Moreover, according to the embodiments of the present invention, since a touch function is realized without needing to individually manufacture a touch screen, a time taken in a process of manufacturing a touch LCD device and the material cost are reduced.

Moreover, according to the embodiments of the present invention, a defect which is caused when a touch screen is bonded to a liquid crystal panel cannot occur.

Moreover, according to the embodiments of the present invention, by using the self-capacitance type, the touch electrode line 160 that connects the touch electrode 150 to the touch driver 190 may be provided in the display area.

Accordingly, since an additional line is not installed in a bezel, a width of the bezel is reduced.

As described above, according to the embodiments of the present, since the common electrode is disposed on the TFT array substrate, a transmittance is further enhanced than an in-cell touch LCD device in which the pixel electrode is disposed on the TFT array substrate. Also, since a transmittance is enhanced, the number of LEDs used as the light source of the backlight unit is reduced, and thus, the number of optical sheets is reduced.

Moreover, according to the embodiments of the present, since the liquid crystal panel is integrated with the touch screen, the manufacturing cost of the in-cell touch LCD device according to the embodiments of the present invention is reduced in comparison with a touch LCD device where the touch screen is bonded to the liquid crystal panel.

Moreover, according to the embodiments of the present, since the touch electrodes configuring the touch screen are disposed in the self-capacitance type and the touch electrode line connecting the touch electrode to the touch IC is provided to overlap the data line, the left bezel and the right bezel of the in-cell touch LCD device are reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An in-cell touch liquid crystal display (LCD) device comprising:
   a pixel driver including a thin film transistor (TFT) disposed in each of a plurality of pixels;
   a passivation part protecting the pixel driver;
   a pixel electrode disposed on the passivation part and connected to a first electrode included in the TFT;
   a touch electrode line disposed on the passivation part and insulated from the pixel electrode;
   a cover part covering the pixel electrode and the touch electrode line; and
   a common electrode disposed on the cover part, connected to the touch electrode line via the cover part, and supplied with a common voltage or a touch driving signal from a touch driver connected to the touch electrode line,
   wherein the pixel driver comprises:
      a light shield layer disposed on a base substrate;
      a buffer layer disposed on the base substrate;
      an active layer, a source electrode, and a drain electrode disposed on the buffer layer, the light shield layer being disposed in a portion corresponding to the active layer;
      a gate insulator disposed to cover the active layer, the source electrode, and the drain electrode;
      a gate electrode disposed in a region, overlapping the active layer, on the gate insulator;
      an interlayer dielectric disposed to cover the gate insulator and the gate electrode; and
      the first electrode connected to the drain electrode via the gate insulator and the interlayer dielectric.

2. The in-cell touch LCD device of claim 1, wherein the passivation part comprises:
   a first passivation layer covering and protecting the TFT, the first electrode, a second electrode included in the TFT, and a data line through which a data voltage is supplied to the second electrode; and
   a second passivation layer disposed on the first passivation layer, the pixel electrode being connected to the first electrode via the second passivation layer and the first passivation layer.

3. The in-cell touch LCD device of claim 1, wherein the pixel electrode is connected to the first electrode via the passivation part, and
   the touch electrode line overlaps the data line.

4. The in-cell touch LCD device of claim 1, wherein the touch electrode line comprises:
   a bridge contact part disposed on the passivation part, the bridge contact part and the pixel electrode being formed simultaneously on the passivation part; and
   a conductive line disposed on the bridge contact part and connected to the common electrode via the cover part.

5. The in-cell touch LCD device of claim 4, wherein the passivation part comprises:
   a first passivation layer covering and protecting the TFT, the first electrode, a second electrode included in the TFT, and a data line through which a data voltage is supplied to the second electrode; and
   a second passivation layer disposed on the first passivation layer,
   wherein the first passivation layer includes SiO$_2$ or SiNx and has a thickness of 1,000 Å to 2,000 Å, and
   the second passivation layer includes photo acryl and has a thickness of 2.0 μm to 3.0 μm.

6. The in-cell touch LCD device of claim 1, wherein the touch electrode line is disposed on the passivation part on which the pixel electrode is disposed, insulated from the pixel electrode, formed of a material having a higher conductivity than the pixel electrode, connected to the common electrode via the cover part, and connected to the touch driver.

7. The in-cell touch LCD device of claim 6, wherein the passivation part comprises:
   a first passivation layer covering and protecting the TFT, the first electrode, a second electrode included in the TFT, and a data line through which a data voltage is supplied to the second electrode; and
   a second passivation layer disposed on the first passivation layer,
   wherein the first passivation layer includes SiO$_2$ or SiNx and has a thickness of 1,000 Å to 2,000 Å, and
   the second passivation layer includes photo acryl and has a thickness of 2.0 μm to 3.0 μm.

8. The in-cell touch LCD device of claim 1, wherein the TFT comprises an active layer including a low temperature poly silicon (LTPS).

9. The in-cell touch LCD device of claim 1, wherein a plurality of common electrodes disposed on the cover part are provided independently from each other, and each of the plurality of common electrodes is connected to the touch driver through the touch electrode line overlapping a data line.

10. A method of manufacturing an in-cell touch liquid crystal display (LCD) device, the method comprising:
forming a pixel driver including a thin film transistor (TFT) in each of a plurality of pixels;
covering, by a passivation part, the pixel driver;
forming a pixel electrode connected to a first electrode of the TFT via the passivation part, on the passivation part;
forming a touch electrode line insulated from the pixel electrode, on the passivation part;
covering, by a cover part, the pixel electrode and the touch electrode line; and
forming a common electrode connected to the touch electrode line via the cover part and supplied with a common voltage or a touch driving signal from a touch driver connected to the touch electrode line, on the cover part,
wherein the forming of the pixel driver comprises:
forming a light shield layer on a base substrate;
covering, by a buffer layer, the light shield layer;
forming an active layer, a source electrode, and a drain electrode disposed on the buffer layer, the light shield layer being disposed in a portion corresponding to the active layer;
covering, by a gate insulator, the active layer, the source electrode, and the drain electrode;
forming a gate electrode in a region, overlapping the active layer, on the gate insulator;
covering, by an interlayer dielectric, the gate insulator and the gate electrode; and
forming the first electrode connected to the drain electrode via the gate insulator and the interlayer dielectric.

11. The method of claim 10, further comprising:
forming a first passivation layer on the TFT, the first electrode, a second electrode included in the TFT, and a data line through which a data voltage is supplied to the second electrode; and
forming a second passivation layer on the first passivation layer,
wherein the passivation part includes the first and second passivation layers, and the pixel electrode is connected to the first electrode via the passivation part.

12. The method of claim 10, further comprising:
simultaneously forming a bridge contact part and the pixel electrode on the passivation part; and
forming a conductive line on the bridge contact part connected to the common electrode via the cover part,
wherein the touch electrode line includes the bridge contact part and the conductive line.

13. The method of claim 11, wherein the first passivation layer includes $SiO_2$ or $SiN_x$ and has a thickness of 1,000 Å to 2,000 Å, and the second passivation layer includes photo acryl and has a thickness of 2.0 μm to 3.0 μm.

14. The method of claim 10, wherein the touch electrode line is disposed on the passivation part on which the pixel electrode is disposed, formed of a material having a higher conductivity than the pixel electrode, connected to the common electrode via the cover part, and connected to the touch driver.

15. The method of claim 10, wherein a plurality of common electrodes disposed on the cover part are provided independently from each other, and each of the plurality of common electrodes is connected to the touch driver through the touch electrode line overlapping the data line.

* * * * *